United States Patent [19]

Rudich, Jr. et al.

[11] Patent Number: 4,559,441
[45] Date of Patent: Dec. 17, 1985

[54] METHOD OF CONTROLLING A SPACE HEATING SYSTEM

[75] Inventors: George Rudich, Jr.; David L. Troup, both of Goshen, Ind.

[73] Assignee: Johnson Service Company, Milwaukee, Wis.

[21] Appl. No.: 579,769

[22] Filed: Feb. 13, 1984

[51] Int. Cl.$^4$ .......................... F24H 3/00; H05B 1/00
[52] U.S. Cl. .................................. 219/364; 219/321; 219/483; 307/39
[58] Field of Search ............... 219/364, 483, 486, 487, 219/320, 321; 307/39; 62/175; 236/1 EA

[56] References Cited

U.S. PATENT DOCUMENTS

| 3,428,784 | 2/1969 | Pinckaers | 219/486 |
| 4,333,002 | 6/1982 | Kozak | 219/321 |
| 4,379,483 | 4/1983 | Farley | 307/39 X |

FOREIGN PATENT DOCUMENTS

| 1335983 | 10/1973 | United Kingdom . |
| 2032141 | 4/1980 | United Kingdom . |
| 2059646 | 4/1981 | United Kingdom . |
| 2076997 | 12/1981 | United Kingdom . |

Primary Examiner—C. L. Albritton
Assistant Examiner—M. M. Lateef
Attorney, Agent, or Firm—Larry L. Shupe; Joseph J. Jochman, Jr.; John P. Ryan

[57] ABSTRACT

A method of controlling a space heating system having a plurality of electrical resistance heaters includes the steps of computing the aggregate number of resistance heaters required to be energized to raise the actual temperature within a space to a set point temperature. This aggregate number may have integer and fractional components. One of the resistance heaters, denominated a controlled heater, is adapted both for continuous energization or for modulated control by intermittent energization. A group of second resistance heaters is adapted for continuous, staged energization, this group including a number of heaters equal to the integer component. Energization of the heaters comprising this group is preferably sequential after the lapse of a preselected interstage time delay between energization of the controlled heater and the first heater of the group. Similarly, time delays will be interposed between the time of energization of the first heater of the group and the times of energization of succeeding heaters in the group. The aggregate number is repetitively recomputed, and the heaters comprising the group of second heaters are successively energized or de-energized in a quantity equal to the integer component. The controlled heater is energized for an average time which is equal to the fractional component. As the actual temperature approaches the set point temperature such that the integer component becomes zero, all heaters in the group are de-energized and when the actual temperature is equal to the set point temperature, the controlled heater is also de-energized.

5 Claims, 4 Drawing Figures

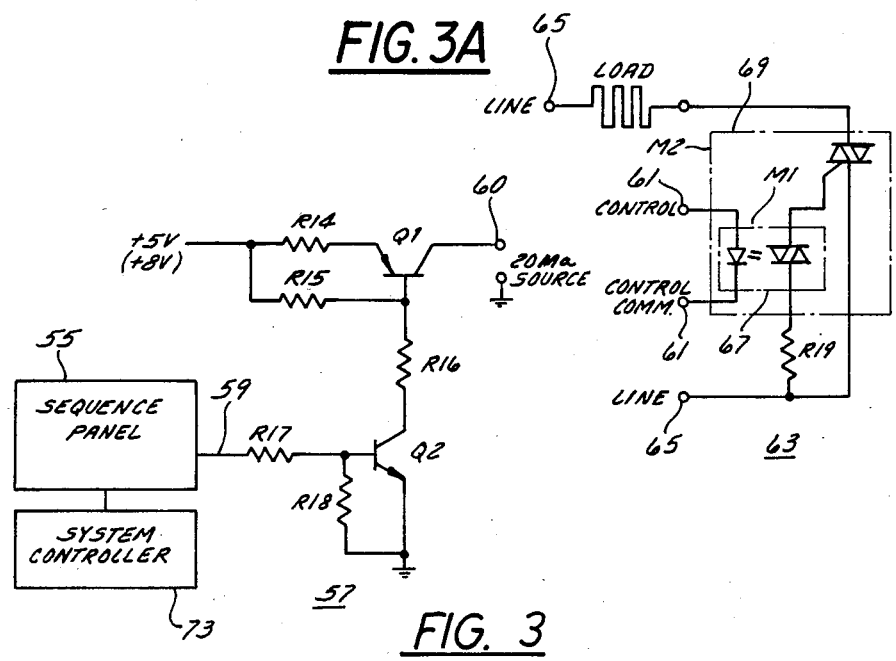

METHOD OF CONTROLLING A SPACE HEATING SYSTEM

BACKGROUND OF THE INVENTION

This invention relates generally to the control of space heating systems and more particularly, to a method of control which utilizes a plurality of electrical resistance heaters, one of which is adapted for modulated control for precise matching of heat output to a heating demand.

In known systems, it is common to energize a complete heating system whenever the actual temperature within a space to be heated falls below a set point temperature by some predetermined minimum value. It is known that thermostatic controls of this type inherently introduce a delay between that time when the actual temperature within the space rises to the set point value and the time when the thermostatic element is able to detect this increase in temperature. Similarly, the thermostatic device will typically exhibit a delay in detecting an actual temperature of which falls below the set point. The resulting overshoot and undershoot of the actual temperature versus the set point temperature may be uncomfortable to the space occupant and is wasteful of energy.

One approach to the solution of this problem is described in U.S. Pat. No. 4,379,483 which shows a method of controlling heat sources using an initial, proportional energization of a first source. If this source is unable to meet the demand for heat, it is fully energized and a second source is thereupon proportionally energized. This sequence continues until the source(s) develops sufficient heat to meet the demand. If, upon initial actuation, the actual space temperature is more than 1.5° F., below the set point temperature, all heat sources are energized and maintained so until the actual temperature rises to a value which is within 1° F. of the set point temperature. At this time, all heating sources are de-energized and thereupon the proportional energization sequence described above is initiated. The temperature in the space must process through a full temperature rise and decline cycle each time it is desired to transfer a heat source from proportional to fully energized control.

While such methods have heretofore been satisfactory, they tend to be characterized by certain disadvantages. In particular, they require the energization of all heat sources unless the actual space temperature is within a predetermined proximity to the set point temperature. Further, they require that the actual space temperature experience a number of cyclic excursions, either requirement of which may be uncomfortable to occupants and wasteful of energy.

A method of controlling a heating system which precisely energizes heating sources in accordance with the magnitude of the difference between the actual and set point temperatures would be a distinct advance in the art.

SUMMARY OF THE INVENTION

A method of controlling a space heating system having a plurality of electrical resistance heaters includes the steps of computing the aggregate number of resistance heaters required to be energized to raise the actual temperature within a space to a set point temperature. This aggregate number may have integer and fractional components. One of the resistance heaters, denominated a controlled heater, is adapted both for continuous energization or for modulated control by intermittent energization. A group of second resistance heaters is adapted for continuous, staged energization, this group including a number of heaters equal to the integer component. Energization of the heaters comprising this group is preferably sequential after the lapse of a preselected interstage time delay between energization of the controlled heater and the first heater of the group. Similarly, time delays will be interposed between the time of energization of the first heater of the group and the times of energization of succeeding heaters in the group. The aggregate number is repetitively recomputed, and the heaters comprising the group of second heaters are successively energized or de-energized in a quantity equal to the integer component. The controlled heater is energized for an average time which is equal to the fractional component. As the actual temperature approaches the set point temperature such that the integer component becomes zero, all heaters in the group are de-energized and when the actual temperature is equal to the set point temperature, the controlled heater is also de-energized.

One object of the present invention is to provide a heating system control method wherein heating sources are energized based upon a computation of the aggregate number of heaters required to raise the actual space temperature to a set point temperature.

Another object of the invention is to provide a method for controlling a heating system wherein one of the resistance heaters is adapted for modulated control by intermittent energization.

Still another object of the present invention is to provide a heating system control method adapted to resolve the total heat output capability of an aggregate number of resistance heaters into increments no larger than a small percentage of that total.

Yet another object of the present invention is to provide a heating system control method wherein only one resistance heater need be adapted for modulated, intermittent energization.

Still another object of the present invention is to provide a method of controlling a heating system wherein space temperature undershooting and overshooting are substantially prevented.

Another object of the present invention is to provide a heating system control method wherein the aggregate number of resistance heaters which are required to be energized is a function of the bandwidth, in temperature degrees, of a heating control band and of the number of individual resistance heaters included within the system. These and other objects of the invention will become more apparent from the detailed description taken in conjunction with the accompanying drawing.

DESCRIPTION OF THE DRAWING

FIG. 3 is an electrical schematic diagram of a circuit useful in conjunction with one of the resistance heaters of the space heating system in FIG. 1, and;

FIG. 3A is another electrical schematic diagram of a circuit useful in conjunction with that shown in FIG. 3.

DETAILED DESCRIPTION OF THE PREFERRED METHODS

Figure 1:
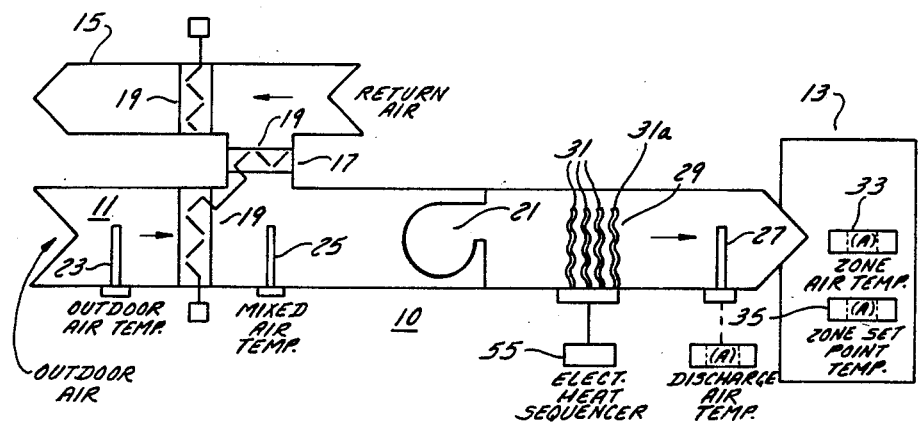
FIG. 1 is a structural diagram in symbolic representation of an exemplary air handling unit, the space heating system portion of which may be controlled by the inventive method.

Understanding of the inventive method will be aided by a description of a typical air handling unit of a type widely used in industrial and commercial applications. Accordingly, the air handling unit 10 of FIG. 1 is shown to include an inlet duct 11 for bringing outdoor air into the space 13 to be heated, an exhaust duct 15 and an interconnecting mixing duct 17. Dampers 19 are disposed within the air handling unit 10 for controlling the flow of air while a fan 21 is provided for air movement. Disposed within the duct 11 are sensors 23, 25, 27 for generating signals representative of the outdoor air temperature, the mixed air temperature and the discharge air temperature, respectively. The air handling unit 10 also includes a space heating system 29 comprising a plurality of electrical resistance heaters 31 which, when energized, will heat the air passing through the duct 11 and flowing into the space 13. A zone temperature sensor 33 is disposed within the space 13 and is adapted to generate a signal representative of the actual air temperature therewithin. The apparatus incorporating the zone temperature sensor 33 may also include a device 35 for selecting a set point temperature which is desired to be maintained within the space 13 and for generating a signal representative of that set point temperature.

Figure 2:
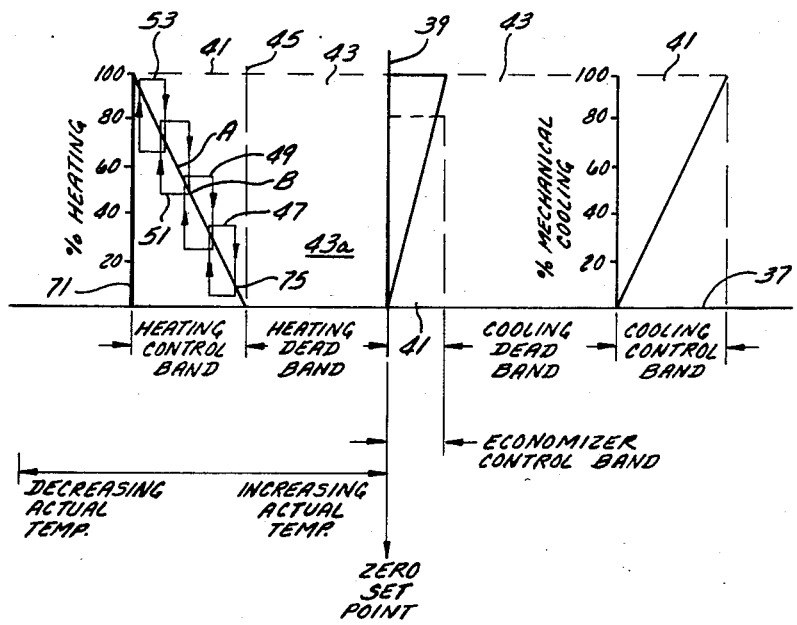
FIG. 2 is a graphical representation of the performance characteristics of the space heating system shown in FIG. 1.

FIG. 2 is a graphical representation which includes a horizontal axis 37 representing a continuum of actual temperatures within a space. A vertical axis 39 intersects the horizontal axis 39 at a point which represents a set point temperature which may be selected by the space occupant. Superimposed upon the axis 37 and in a relationship relative to the vertical axis 39 are graphically depicted a number of control bands 41 and deadbands 43. Representations such as that of FIG. 2 are widely used by persons in the heating arts to depict the type and extent of temperature corrective action which will be exhibited by a system in accordance with several factors including any difference between the actual and set point temperatures and only those bands to the left of the vertical set point axis 39 are relevant to this description. While not an absolute requirement, it is not uncommon for a system designer to incorporate a heating deadband 43a as a performance function. When so incorporated, no heat will be added to the space 13, notwithstanding the fact that the actual temperature may be slightly below the set point temperature. However, if the actual temperature falls below the left vertical axis 45 of the heating deadband 43a, one or more electrical resistance heaters 31 will be energized depending upon the difference, in temperature degrees, between the temperature represented by the intersection of the axis 45 with the horizontal temperature axis 37 and the actual space temperature. In the exemplary portrayal, it is assumed that the space heating system incorporates four electrical resistance heaters, the cyclical operation of each of which is depicted by rectangular envelopes 47, 49, 51, 53. Conventional systems are arranged such that if the actual temperature is represented by a vertical axis passing through point "A", either two or three resistance heaters 31 will be energized even though a more precise, energy-conserving control method would dictate that, effectively, only about two and one-half heaters would ideally be used.

In practice, the actual number of resistance heaters 31 within a particular air handling unit 10 may vary from one as a minimum to 12 or more depending upon the size of the unit 10.

The method of the present invention is particularly adapted to be carried out by the zone controller and sequencer panel shown and described in co-pending patent application Ser. No. 6-505,224 which was filed on June 17, 1983, is entitled "ZONE CONDITION CONTROLLER AND METHOD OF USING SAME" which is assigned to the same assignee as this application. The aforementioned application is incorporated herein by reference. The zone controller described therein is a microprocessor-based apparatus adapted to receive sensor signals representative of, inter alia, the actual temperature of the air within the space, the set point temperature and the discharge air temperature. The sequence panel 55 disclosed therein and shown in FIG. 1, also a microprocessor-based structure, may be used to effect pulse width modulation of the electronic circuit 57 shown in FIG. 3. Referring to the incorporated application, the circuit 57 includes a lead 59 to be coupled to the pin 11 (PC2) of the microprocessor in the sequence panel 55 and has a pair of output terminals 60 for applying the 20 mA output signal to the terminals 61 of a load control circuit 63. When this connection between the circuit 57 and pin 11 is made, the jumper between R18 and R53 is removed. The load control circuit 63 has a pair of power terminals 65 for attachment to the A.C. line and one of the heaters 31a, termed the first controlled heater, and incorporates an opto-coupled zero voltage triggering circuit 67 for selectively permitting a power triac, back-to-back SCR's or functional equivalent to energize the first controlled heater 31a connected thereto. In the alternative and for a slightly lower manufactured cost, the triggering circuit 67 including the power triac may be replaced by a Crydom type D2425 solid state relay 69.

Understanding of the inventive control method will be further aided by assuming the existence of certain exemplary conditions which prevail at the time of an initial demand for heat. It will be assumed that the zone or space set point temperature is 70° F. and that no provision for heating deadband has been incorporated within the system. If graphically represented in a manner similar to FIG. 2, the vertical axis 45 would be coincident with the right vertical boundary axis 39 of the heating control band 41. It will be further assumed that the heating control band 41 has a bandwidth, in temperature degrees, of 10° F., this temperature bandwidth being represented by the horizontal distance between the right and left boundaries 45 and 71, respectively. A further assumption is that the air handling unit 10 has four resistance heaters disposed therein, three heaters 31 and a controlled heater 31a, and that the actual temperature within the space 13 is 63.75° F. One feature of the sequence panel 55, described in the aforementioned incorporated application, is that its microprocessor may be programmed to recognize the bandwidth of the heating control band 41 and to further recognize the number of resistance heaters installed within the air handling unit 10. The sequence panel 55 will thereupon distribute the heating effect of the resistance heaters 31, 31a uniformly over the heating control band 41.

The system controller 73, having received therewithin signals which represent the actual and set point temperatures, computes the aggregate number of resistance heaters 31, 31a required to be energized to raise the actual temperature within the space 13 to the value of the set point temperature. Under the assumed conditions described above and graphically generally represented in FIG. 2 as point "A", this aggregate number will be 2.5, "2" being the integer component as represented by the envelopes 47 and 49 and "0.5" being the fractional component as represented by one-half the width of envelope 51. Further recognizing at the time of initialization that no resistance heaters 31, 31a are energized, the controller 73 will generate a command which causes the sequence panel 55 to energize the controlled resistance heater 31a and a group of second resistance heaters 31, the latter in sequence after the lapse of preselected interstage time delays. This group will include a number of heaters 31 equal in number to the integer component, 2 in the exemplary case. Heat will thereupon be introduced into the space 13, and its actual temperature will rise to approach the set point. The controller 73 repetitively re-computes the aggregate number, thereby causing the controlled heater 31a to be energized for a decreasing average time. As the aggregate number declines through 2.0 in the exemplary case to, say, a value of 1.95, the sequence panel 55 will disable one of the two formerly-energized heaters in the group and simultaneously cause the controlled heater 31a to be intermittently energized 95% of the selected cycle time. Intermittent energization persists for a declining percentage of each cycle time until the actual temperature equals the set point temperature, at which time the first heater 31a is de-energized.

This mode of operation is graphically represented in FIG. 2 wherein, in the exemplary heating system 29 having four resistance heaters, portrays the operating curves of the controlled Stage 4 heater, envelope 53 in the graph, and those of the heaters of Stages 1–3, envelopes 47, 49, 51 respectively, the first two of which comprise the second group of heaters in the example. In the example, an initial command resulting from the computation of an aggregate number of 2.5 would be represented by point "A". In that circumstance, Stages 1 and 2 would be energized, preferably in staged sequence, while Stage 4 would be intermittently energized for 50% of the selected cycle time. As the actual temperature rises toward the set point temperature, the percentage of the cycle time during which Stage 4 is energized will decline as represented by the downward slope of line 75. Upon reaching a temperature differential represented the aggregate number 1.95, represented generally by point "B", Stage 2 will be de-energized and Stage 4 will be energized 95% of each cycle time.

Control in this manner permits the precise introduction of only that quantity of heat required to increase the space temperature and causes the actual temperature to approach the set point substantially asymptotically rather than by overshooting and undershooting the set point temperature. In the aforementioned first preferred method, each of the heaters 31 comprising the group of second resistance heaters is energized after the lapse of an interstage time delay following energization of the controlled resistance heater 31a or the preceding heater in the group, as the case may be. The reasons for this sequential energization are that such delays help prevent short cycling of contactors and allow the zone controller 73 to detect the effect of energizing a stage before energizing the next stage. Additionally, the local power company may have restrictions upon the maximum size of the load increase that may be imposed upon the line at any one time.

In a second preferred method, no interstage time delays are employed. The system controller 73 likewise computes the aggregate number of resistance heaters 31, 31a required to be energized to raise the actual temperature within the space 13 to the value of the set point temperature. The controller 73 will thereupon generate a command which causes the sequence panel 55 to intermittently energize the controlled heater 31a for an average time which is equal to the fractional component. Simultaneously, a group of second heaters is continuously energized, this group including a number of heaters 31 equal to the integer component. The aggregate number is repetitively recomputed and the heaters 31 comprising the group are successively de-energized as the integer component approaches and is ultimately equal to zero. The controlled heater 31a continues to be intermittently energized for an average time which is equal to the fractional component. When the actual temperature is equal to the set point temperature, the controlled heater 31a is also de-energized.

The computation of the aggregate number of resistance heaters 31, 31a is preferably performed by selecting a bandwidth BW, in temperature degrees, of a heating control band 41. In the assumed, exemplary case, this bandwidth is 10° F. The bandwidth is then divided into a plurality of increments, each having an increment width in temperature degrees. In the preferred embodiment, the number of increments will correspond to the number $N_r$ of resistance heaters 31, 31a in the system, four in the exemplary case, and the bandwidth of each increment will be BW divided by $N_4$, 2.5° F., in the example. The difference, in temperature degrees, between the set point and actual temperatures is then determined and this difference, 6.25° F. in the example, is divided by the increment width, 2.5°, to derive the aggregate number of heaters, 2.5.

It will be appreciated by those of ordinary skill in the art that one may control the space heating system through a heating proportional control band 41 which is a function of discharge air (DA) temperature rather than a function of room temperature. With this approach, a broad discharge air proportional band would have a discharge air temperature controlled to be at, e.g., 70° F. for a space set point temperature of 70° F. and controlled to be at 140° F. for a room temperature of 60° F., assuming a room temperature based proportional band having a bandwidth BW of 10° F. However, more precise control and better energy conservation will result if an incremental DA proportional band is selected to have a bandwidth which is substantially less than the 70° F. (140° F.–70° F.) broad band width and an incremental bandwidth in the range of 15° F. to 30° F. is preferred. The use of a control approach which is a function of DA temperature, as sensed by sensor 27, will avoid the necessity of resolving the output signals of the temperature sensor 33 to extremely fine increments. It will also avoid problems related to the inherent time delay between the establishment of a particular temperature within a space 13 and the ability of commonly-available sensors to detect that temperature. It is therefore preferred that the control method be based upon temperatures of the discharge air rather than upon the room-temperature-based boundaries of the heating control band 41.

In the aforementioned example, the first resistance heater 31a was described to be intermittently energized and de-energized with the average exemplary time of intermittent energization being equal to the fractional component 0.5; that is, 50% of the cycle time. When configuring the equipment and the programming used to carry out the inventive method, it is desirable to select a cycle time which is sufficiently long to permit the first heater 31a to reach a substantial operating temperature and yet sufficiently short that the time during which the first heater 31a is energized will not result in a temperature overshoot within the space 13. A cycle time of between one and 30 seconds may be selected for optimum operation and about two seconds is preferred. It is further desirable to provide for fine resolution control of the space heating system 29. An incremental resolution capability within a range of 0–4% will provide generally acceptable performance with about 1% resolution being preferred. Since binary numbers are inherently used in microprocessors and in view of the preferred resolution of 1%, i.e., one part in one hundred, it is additionally desirable that the energization of all (100%) of the resistance heaters 31, 31a within the system 29 be capable of being represented by a binary number which permits resolution to at least 1%. In the preferred method, the lowest total digital bit count which can provide such resolution is 128, the lowest binary number nearest to but in excess of one hundred. It will now be appreciated that the preferred cycle time of about two seconds may conveniently be selected in view of the aforementioned total bit count and further in view of the fact that a 60 Hz AC line voltage will transcend its zero voltage axis 120 times over two seconds, a number closely proximate to 128. It should also be appreciated that resolution to any precise percentage may be accomplished and the selected resolution converted to any binary number. However, the direct resolution by the aforementioned digital bit count will be conserving of instructional steps in the microprocessor programming.

After the aggregate number is computed and its fractional component known, this component may then be resolved to a first bit count which represents a portion of the selected cycle time during which the first controlled heater 31a is to be energized. Using again the example described above wherein the aggregate number is computed to be 2.5, the first resistance heater 31a will be energized for 50% of each cycle time, the cycle time being approximately two seconds in the preferred method. Translated into bit counts, and recognizing that (a) the exemplary space heating system 29 has four resistance heaters 31, 31a and (b) the entire system 29 may be represented by a total bit count of 128, the controlled resistance heater 31a will be energized for a first bit count of 16 (128 divided by 4 heaters and the quotient, 32, multiplied by 50% or 0.5) and will be de-energized for 50% of each cycle time, i.e., that portion of the cycle time represented by the difference between the quotient bit count and the first bit count.

Using another example, it will be assumed that the space heating system 29 includes eight resistance heaters 31, 31a, one of which is the controlled heater 31a. It is further assumed that the room temperature-based heating proportional control band 41 has a bandwidth BW of 16° F., the set point temperature is 70° F. and the actual room temperature is 62.5° F. In accordance with the method described above of computing the aggregate number, the proportional bandwidth BW is 16, the number of heaters $N_r$ and therefore the number of increments is 8 and the width of each increment is computed to be 2° F. Since the difference between the actual and setpoint temperatures is 7.5° F., the aggregate number computes to be 7.5 divided by 2, or 3.75. This aggregate number is interpreted to mean that in order to bring the actual temperature into correspondence with the setpoint temperature, the sequence panel 55 must initially energize 3 heaters 31 within the group and must further energize the controlled heater 31a for 75% of each cycle time. Since all 8 heaters are represented by a bit count of 128, the controlled heater 31a is represented by a bit count of 128 divided by 8 or 16 bits. Since this latter heater 31a is to be energized 75% of each cycle time, it will be energized for 12 out of each 16 bit counts.

When intermittently energizing the first controlled heater 31a in the manner described above and using microprocessor-based equipment, it is preferred that electrical power be applied and removed from the heater 31a by an electronic circuit 57 which is responsive to digital control signals from the sequence panel 55 and by a power circuit 63 which permits the energization and de-energization of the controlled resistance heater 31a only during those brief periods of time when the A.C. line voltage coupled to the power terminals 65 is no greater than approximately 9% of its peak value, i.e., approximately 12.5% of its RMS value. These brief periods of time occur, of course, only when the A.C. line voltage is closely proximate to a zero voltage reference axis, an event which occurs 120 times each second for a 60 Hz line. Switching in this manner is desirable as it will dramatically reduce the generation of spurious radio frequency (RF) interference.

The following components have been found useful in constructing the circuit shown in FIG. 3. Resistances are in ohms, 5% tolerance unless otherwise specified.

| FIG. 3 | | | |
|---|---|---|---|
| R14 | 51 | R15 | 560 |
| R16 | 820 | R17 | 10K |
| R18 | 47K | R19 | 360 |
| Q1 | ZN3703 | Q2 | GES5822 |
| M1 | MOC3041 | M2 | Crydom D2425 |

While only a few variations of the inventive method have been described, it is not intended to be limited thereby but only by the scope of the claims which follow.

We claim:

1. A method of controlling a space heating system having a first controlled resistance heater adapted for modulated control by intermittent energization, and a plurality of second resistance heaters, said method including the steps of:

selecting a total bit count representative of the entire heating capacity of said heating system;

generating a signal representative of a set point temperature to be maintained within a space;

generating a signal representative of the actual temperature within said space;

computing the aggregate number of said resistance heaters required to be energized to raise said actual temperature to a value equivalent to said set point temperature, said aggregate number including a fractional component;

resolving said fractional component to a first bit count representative of a portion of a cycle time during which said controlled heater is to be energized, said cycle time being at least one second and not greater than thirty seconds, said;

repetitively, intermittently energizing said controller heater over said cycle time, said controlled heater being energized for that portion of said cycle time represented by said first bit count, said controlled heater being de-energized for that portion of said cycle time represented by the difference between said total bit count and said first bit count.

2. The method set forth in claim 1 wherein said total bit count is that binary number nearest the product of a multiplicand 60 and a multiplier, said multiplier being the number of seconds in said cycle time.

3. The method set forth in claim 1 wherein said cycle time is about two seconds and said total bit count is 128.

4. A method of controlling a space heating system having a first controlled resistance heater adapted for modulated control by intermittent energization, and a plurality of second resistance heaters, said method including the steps of:

selecting a total bit count representative of the entire heating capacity of said heating system;

generating a signal representative of a set point temperature to be maintained within a space;

generating a signal representative of the actual temperature within said space;

computing the aggregate number of said resistance heaters required to be energized to raise said actual temperature to a value equivalent to said set point temperature, said aggregate number including a fractional component;

resolving said fractional component to a first bit count representative of a portion of a cycle time during which said controlled heater is to be energized, said cycle time being at least one second and not greater than thirty seconds, and;

repetitively, intermittently energizing said controlled heater over said cycle time, said controlled heater being energized for that portion of said cycle time represented by said first bit count, said controlled heater being de-energized for that portion of said cycle time represented by the difference between said total bit count and said first bit count, said intermittent energization of said controlled heater being repetitive over a plurality of sequentially-occurring cycle times, said intermittent energization being by digital signals directed to an electronic circuit adapted for controllably coupling and uncoupling said modulated heater to an alternating voltage line;

said electronic circuit being adapted for controllably switching a triac and said coupling and uncoupling is permitted to occur only within brief periods of time during which said alternating voltage is closely proximate to a zero voltage reference axis, thereby reducing spurious radio frequency interference.

5. A method of controlling a space heating system having a first controlled resistance heater adapted for modulated control by intermittent energization, and a plurality of second resistance heaters, said method including the steps of:

selecting a total bit count representative of the entire heating capacity of said heating system;

generating a signal representative of a set point temperature to be maintained within a space;

generating a signal representative of the actual temperature within said space;

computing the aggregate number of said resistance heaters required to be energized to raise said actual temperature to a value equivalent to said set point temperature, said aggregate number including a fractional component;

resolving said fractional component to a first bit count representative of a portion of a cycle time during which said controlled heater is to be energized, said cycle time being at least one second and not greater than thirty seconds;

repetitively, intermittently energizing said controller heater over said cycle time, said controlled heater being energized for that portion of said cycle time represented by said first bit count, said controlled heater being de-energized for that portion of said cycle time represented by the difference between said total bit count and said first bit count;

said aggregate number further including an integer component and said method further including the step of continuously energizing a number of second resistance heaters, said number being equal to said integer component;

said computing step including the steps of:

generating a command signal representative of the difference between said set point temperature signal and said actual temperature signal;

generating a response signal representative of the difference between said aggregate number of resistance heaters required to be energized and an aggregate number of resistance heaters then actually energized;

detecting any error between said command signal and said response signal, and;

energizing at least one of said second resistance heaters, thereby eliminating said detected error.

* * * * *

UNITED STATES PATENT AND TRADEMARK OFFICE
CERTIFICATE OF CORRECTION

PATENT NO. : 4,559,441
DATED : December 17, 1985
INVENTOR(S) : George Rudich, Jr. and David L. Troup It is certified that error appears in the above-identified patent and that said Letters Patent are hereby corrected as shown below:

Column 3, line 34, "39" should be --37--

Column 5, line 33, "wherein" should be --which--

Column 5, line 50, insert --by-- between "represented" and "the"

Column 6, line 33, subscript "4" should be --r--

Column 7, line 67, "$N_r$and" should be --$N_r$ and--

Column 9, line 2, "said" should be --and--

Column 10, line 27, "controller" should be --controlled--

Signed and Sealed this

First Day of July 1986

[SEAL]

*Attest:*

DONALD J. QUIGG

*Attesting Officer*  *Commissioner of Patents and Trademarks*